United States Patent
Haney et al.

(10) Patent No.: US 12,219,936 B2
(45) Date of Patent: *Feb. 11, 2025

(54) BIRD FEEDER WITH ELASTOMERIC FEED PORT

(71) Applicant: Woodstream Corporation, Lancaster, PA (US)

(72) Inventors: Luke Benjamin Haney, Lititz, PA (US); Steven Charles Lorraine, Glastonbury, CT (US)

(73) Assignee: Woodstream Corporation, Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,485

(22) Filed: Jun. 8, 2022

(65) Prior Publication Data
US 2022/0295754 A1  Sep. 22, 2022

Related U.S. Application Data

(63) Continuation of application No. 16/774,617, filed on Jan. 28, 2020, now Pat. No. 11,369,089.

(60) Provisional application No. 62/799,302, filed on Jan. 31, 2019.

(51) Int. Cl.
*A01K 39/01* (2006.01)

(52) U.S. Cl.
CPC ................... *A01K 39/01* (2013.01)

(58) Field of Classification Search
CPC .... A01K 39/0206; A01K 39/00; A01K 39/01; A01K 39/0106; A01K 39/0113; A01K 39/02
USPC ..... 119/57.8, 52.2, 72, 51.03, 52.3, 57.9, 74
See application file for complete search history.

(56) References Cited

U.S. PATENT DOCUMENTS

| | | | | |
|---|---|---|---|---|
| 5,025,753 | A | * | 6/1991 | Schneider .......... A01K 39/0106 119/51.03 |
| 5,640,927 | A | | 6/1997 | Klein |
| 5,806,460 | A | * | 9/1998 | Klein .................... A01K 39/02 119/72 |
| 6,012,414 | A | * | 1/2000 | Klein ................. A01K 39/0113 119/72 |

(Continued)

FOREIGN PATENT DOCUMENTS

| | | |
|---|---|---|
| CA | 2904272 A1 | 3/2016 |
| EP | 2995197 A2 | 3/2016 |
| EP | 2995197 A3 | 4/2016 |

OTHER PUBLICATIONS

European Search Report, Application No. 20154655.3-1011, dated Jun. 9, 2020, 9 pages.

(Continued)

*Primary Examiner* — Yvonne R Abbott-Lewis
(74) *Attorney, Agent, or Firm* — Barley Snyder

(57) ABSTRACT

An elastomeric feed port and a bird feeder having a seed reservoir with a seed opening fitted with such an elastomeric feed port is provided. The feed port has an elastomeric seed control membrane with a cutout that forms at least one aperture through which birds can access seed in the reservoir. The cutout is shaped to create flexible flaps or fingers adjacent the aperture in the membrane that partially cover the seed opening to reduce seed spillage but that can be pushed aside or temporarily deformed by a bird when the bird inserts its beak into the cutout aperture to access seed therethrough.

24 Claims, 12 Drawing Sheets

(56) References Cited

U.S. PATENT DOCUMENTS

| | | | | |
|---|---|---|---|---|
| 7,555,997 | B2* | 7/2009 | Wolfe, Jr. | A01K 15/025 |
| | | | | 119/707 |
| 8,763,556 | B1* | 7/2014 | Vaughn, Jr. | A01K 39/0206 |
| | | | | 119/52.2 |
| 2008/0314327 | A1 | 12/2008 | Hepp et al. | |

OTHER PUBLICATIONS

Canadian Office Action dated Dec. 8, 2023, corresponding to Application No. 3,069,969, 4 pages.

* cited by examiner

BIRD FEEDER WITH ELASTOMERIC FEED PORT

CROSS-REFERENCE TO RELATED APPLICATIONS

This application is a continuation application of U.S. patent application Ser. No. 16/774,617, filed Jan. 28, 2020, which claims priority under 35 U.S.C. § 119 to U.S. Provisional Patent Application No. 62/799,302, filed Jan. 31, 2019, the entire disclosures of which are incorporated by reference herein.

FIELD OF THE INVENTION

The present disclosure is related to the field of bird feeders for wild birds and, more particularly, to an elastomeric grommet-style feed port for reducing bird seed spillage under non-bird-feeding conditions and to a bird feeder having such ports.

BACKGROUND

Bird feeders that dispense seed typically include a seed reservoir having at least one feed port with an opening through which birds access the seed in the reservoir. To reduce the spillage of seed, many styles of bird feeders have recessed ports from which, under average feeding conditions, most seed does not escape due to the distance the seed must be moved before it will fall out of the feeder. However, should the feeder be subjected to shaking, spinning, striking, tilting, lifting or other physical displacement from a static feeder position, seed will begin to fall out of the reservoir through the uncovered feed port openings.

Seed waste is one of the leading causes of consumer dissatisfaction with bird feeders. It has been found that many consumers choose to stop using bird feeders because the feeders spill seed all over the ground and, as seed for wild birds is seen as a luxury or non-essential expense, most consumers do not want to have it wasted, particularly in a location where other feeding animals, such as squirrels, can freely access the spilled seed.

Accordingly, a need exists for a bird feeder with an improved feed port having an opening that is readily accessible to birds while at the same time reducing seed spillage and waste.

SUMMARY

In view of the foregoing, the present disclosure is directed to a bird feeder having a seed reservoir with a seed opening and an elastomeric feed port. The feed port has an elastomeric body that includes a grommet-style edge member and a center seed control membrane, preferably molded as one piece forming a monolithic body. The seed control membrane is preferably surrounded by the edge member which fits within the seed opening in the side of the seed reservoir and secures the feed port to the seed reservoir. As used herein, a "grommet-style" edge member is defined as an insertable member that is mounted within the seed opening so as to be secured against the adjacent edge of the material that defines the seed opening, such as against the edge of the reservoir side wall adjacent the seed opening.

The elastomeric seed control membrane has a cutout that forms at least one aperture through which birds can access seed in the reservoir. According to a preferred embodiment, the cutout is shaped to create flexible flaps or fingers adjacent the aperture in the membrane that at least partially cover the seed access area but that can be pushed aside or temporarily deformed by a bird when the bird inserts its beak into the cutout aperture to access seed therethrough. When birds are not feeding, however, the flexible flaps or fingers of the seed control membrane act as baffles or screening members over the seed opening to effectively reduce seed spills as might otherwise occur when the feeder is subjected to physical displacement by, among other things, general weather effects, squirrel activity, and feeder maintenance activities, such as when the user adds seed to the feeder.

Accordingly, it is an object of the present disclosure to provide a bird feeder having a seed reservoir with a seed opening, the seed opening being fitted with an elastomeric feed port that is secured within the seed opening of the reservoir and that includes an elastomeric seed control membrane which at least partially covers the seed opening to reduce seed spillage during times when birds are not feeding from the feeder.

Another object of the present disclosure is to provide a bird feeder having an elastomeric feed port in accordance with the preceding object in which the feed port is preferably one piece and includes a grommet-style edge member formed as an outer ring surrounding the elastomeric membrane, the membrane having a cutout that forms at least one aperture through which birds can access seed in the reservoir.

A further object of the present disclosure is to provide a bird feeder with an elastomeric grommet-style feed port in accordance with the preceding objects in which the cutout is shaped to create flexible flaps or fingers adjacent the aperture in the membrane, the flaps or fingers covering at least part of the seed access area when birds are not feeding to reduce seed spills while being flexible to allow a bird to temporarily deform or push them aside when the bird inserts its beak into the cutout aperture to access seed therethrough.

A still further object of the present disclosure is to provide a bird feeder with an elastomeric grommet-style feed port in accordance with the preceding objects in which the cutout is shaped like an asterisk, having an open central region and a plurality of radially-extending arms that define narrow open areas with the flaps or fingers being formed by the portions of the membrane in the generally triangular areas between adjacent arms.

Yet another object of the present disclosure is to provide a bird feeder with a seed opening fitted with a feed port having an apertured elastomeric membrane, the apertured elastomeric membrane allowing birds to access seed while also functioning as a baffle to partially cover the opening and reduce seed spillage under non-bird-feeding conditions in which the feeder is subject to physical displacement such as shaking, spinning, striking, tilting, lifting or other physical displacement from a static feeder position.

Still another object of the present disclosure is to provide a bird feeder with a feed port having an elastomeric membrane in accordance with the preceding object in which the apertured membrane includes a cutout shaped to form a plurality of flexible flaps or fingers adjacent open areas of the cutout, at least the edges of the flaps or fingers being elastically deformable by a bird accessing seed through the cutout while, in the absence of bird activity, the flaps or fingers at least partially cover the opening in the seed reservoir to block seed from falling out of the reservoir.

A further object of the present disclosure is to provide a bird feeder with a feed port in accordance with the preceding two objects in which the feed port includes a grommet-style edge member forming an outer ring and the cutout has an open central region and a plurality of open arms so as to be generally shaped like an asterisk, the flaps or fingers being formed by the portions of the membrane in the generally triangular areas between adjacent arms.

Yet another object of the present disclosure is to provide a bird feeder with a feed port in accordance with the preceding object in which the grommet-style outer ring and the membrane are both elastomeric and are preferably made as a single piece.

Another object of the present disclosure is to provide an elastomeric feed port for a bird feeder, the feed port including an elastomeric seed control membrane that blocks seed spillage, the membrane having at least one cutout with the edges thereof being temporarily deformable by a feeding bird to allow access to seed in the bird feeder while being elastic to return to a seed blocking configuration when birds are not feeding.

Yet another object of the present disclosure is to provide an elastomeric feed port for a bird feeder in accordance with the preceding object in which the at least one cutout is an elongated slit.

Still another object of the present disclosure is to provide an elastomeric feed port for a bird feeder in accordance with the preceding two objects in which the elastomeric seed control membrane includes a grommet-style edge member that is mounted within an elongated opening in the seed reservoir of the bird feeder, a center part of said elastomeric seed control membrane having a plurality of cutouts formed as elongated linear slits.

Yet another object of the present disclosure is to provide an elastomeric feed port for a bird feeder in accordance with the preceding object in which the elongated linear slits are substantially parallel with one another.

Yet another object of the present disclosure is to provide an elastomeric feed port for a bird feeder in accordance with the preceding object in which the elongated opening in the seed reservoir is generally rectangular and the grommet-style edge member is also generally rectangular.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Figure 1:
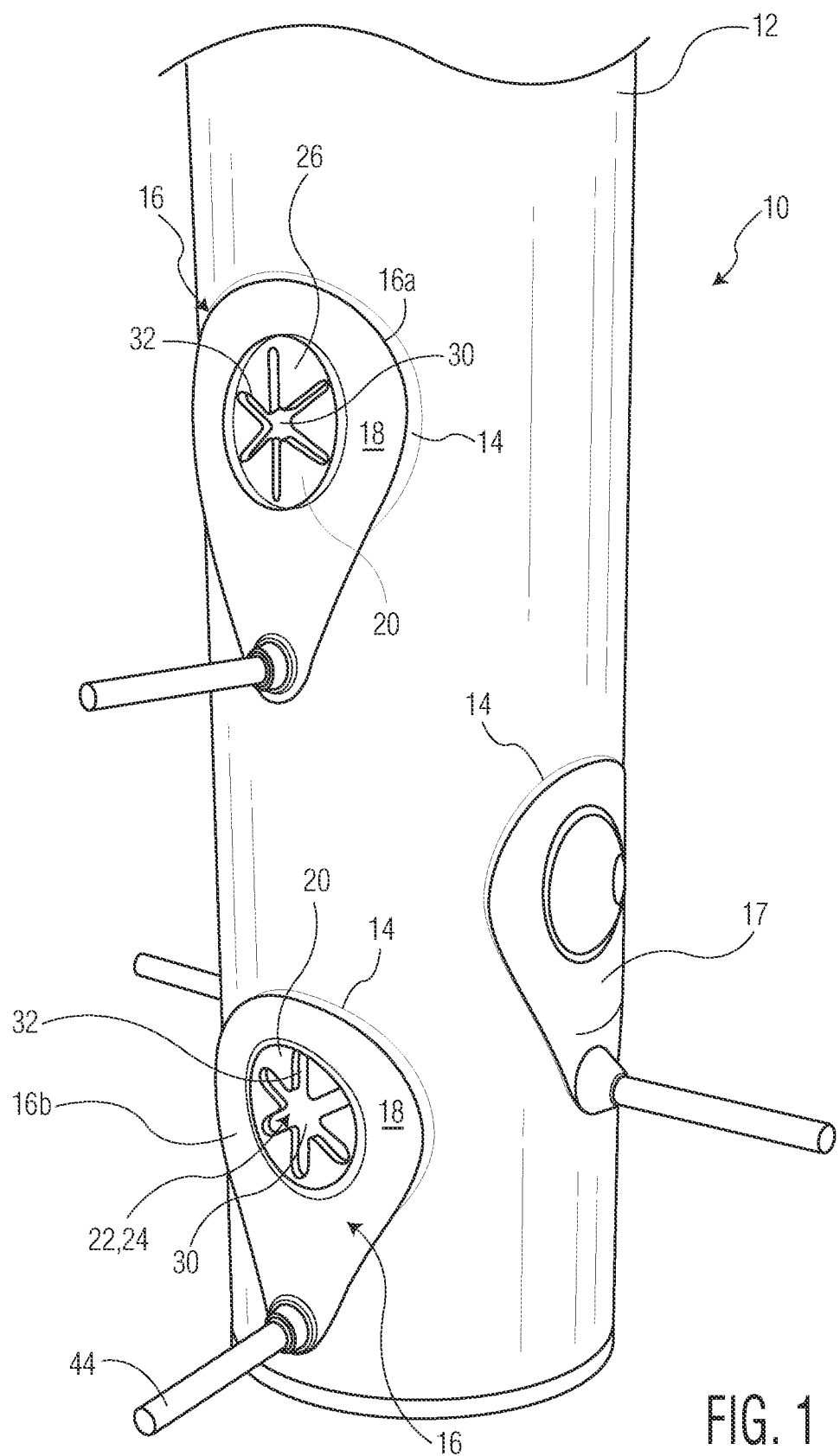
FIG. 1 is a perspective view of a bird feeder including a seed reservoir with two elastomeric feed ports having integrated perches in accordance with the present disclosure.

It is to be understood that the embodiments described herein are disclosed by way of illustration only. It is not intended that the disclosure be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 4:
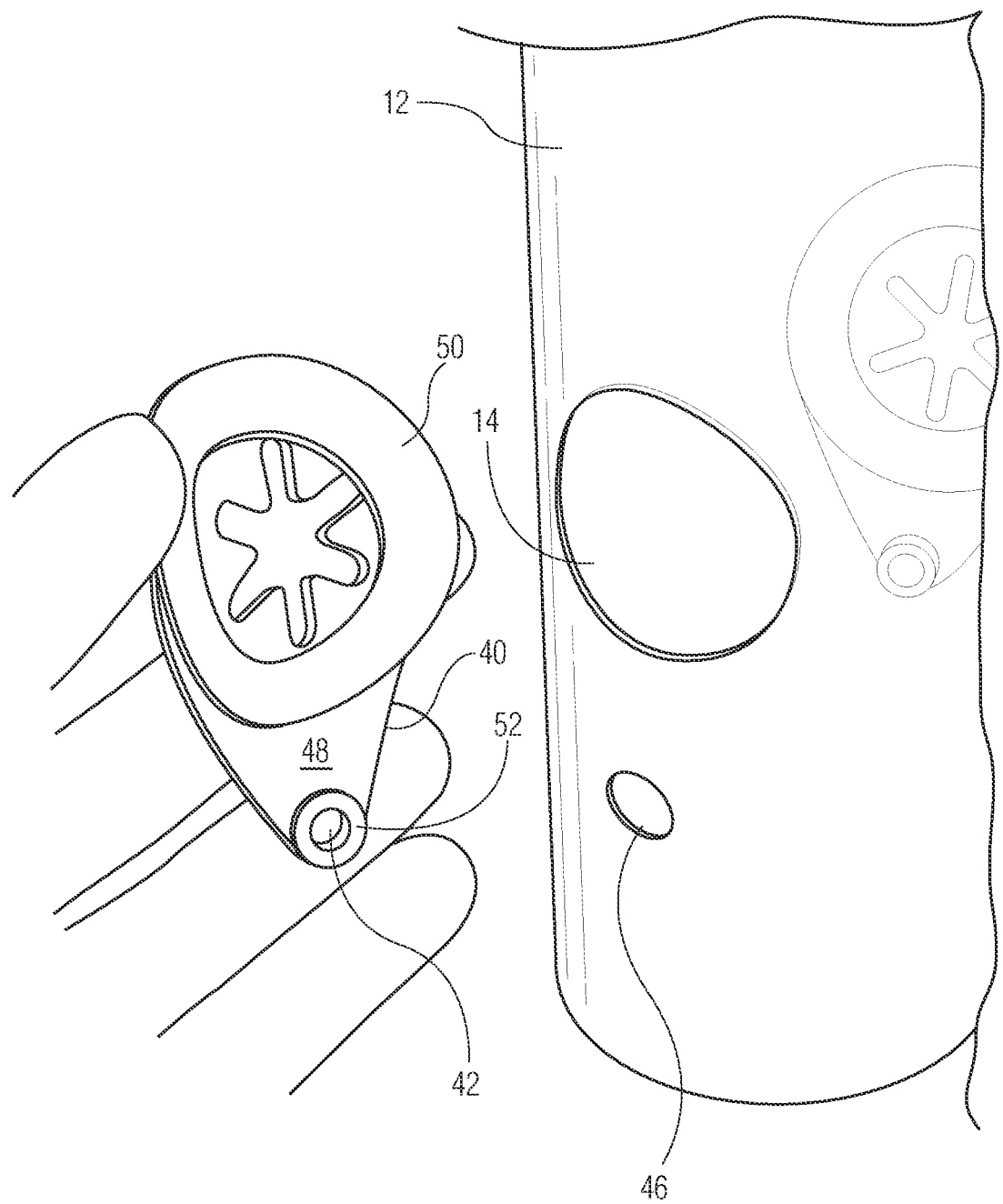
FIG. 4 is a rear perspective view of the feed port shown in FIG. 3 after being removed from the seed opening in the reservoir.

As shown in FIG. 1, the present disclosure is directed to a bird feeder generally designated by reference numeral 10 having a seed reservoir 12 with at least one seed opening 14 (see also FIG. 4). In the example feeder shown in FIG. 1, two of the seed openings 14 are fitted with elastomeric feed ports, generally designated by reference numeral 16, which include an upper feed port 16a and a lower feed port 16b. FIG. 1 also depicts a molded plastic feed port 17.

Each feed port 16 is preferably formed as one piece and includes an elastomeric outer ring 18 that surrounds an elastomeric seed control membrane 20. As used herein, the outer "ring" 18 is defined as the perimeter of the feed port 16 and is not limited to being circular in shape but may be oval or any polygonal shape such as rectangular, triangular, hexagonal and the like. In most cases the shape of the outer ring 18 will be selected to correspond, or to be in substantial correspondence, with the shape of the seed opening 14 in the reservoir 12. As used in connection with correspondence between the shape of the outer ring 18 and the shape of the seed opening 14, "substantial" is defined as being similar enough in shape to functionally secure the outer ring 18 within the seed opening 14 (e.g., via a press-fit) so that the feed port 16 is not disengaged from the seed reservoir 12 by a feeding bird when in normal use.

The elastomeric seed control membrane 20 has a cutout generally designated by reference numeral 22 that forms at least one aperture 24 through which birds can access seed in the reservoir 12 while the remainder of the membrane 20 covers the reservoir seed opening 14. According to the first embodiment, the cutout 22 is shaped to create flexible flaps or fingers 26 adjacent the aperture 24 in the membrane 20. The flaps or fingers 26 cover part of the seed access area defined by the reservoir seed opening 14 when birds are not feeding to prevent seed spills while at least the edges thereof are flexible to allow a bird to temporarily deform or push them aside when the bird inserts its beak into the cutout aperture 24 to access seed therethrough.

In the embodiment shown in FIG. 1, the cutout 22 has a central region 30 and a plurality of radially-extending arms 32, in this case six, so as to be generally shaped like an asterisk. The central region 30 and the arms 32 are open areas with the flaps or fingers 26 being formed by the portions of the elastomeric membrane 20 in the generally triangular areas between adjacent arms 32. As used herein in connection with the shape of the cutout 22, "generally" is intended to refer to an asterisk shape as well as shapes that would be recognized by the ordinary observer as resembling an asterisk. As used herein, "generally triangular" is intended to refer to a shape that is triangular as well as shapes that have rounded corners that do not meet the mathematical definition of a triangle but that would be recognized by ordinary persons as resembling a triangle.

While the general shape of the cutout 22 is the same in the upper and lower feed ports 16a, 16b of FIG. 1, the lower feed port 16b has a larger open area as defined by the width of the arms 32 and the diameter of the central region 30. The feed port 16b could therefore be effectively used with larger seeds while the feed port 16a is able to prevent spillage of smaller seeds. The cutouts 22 may be made with a greater or lesser number of the arms 32, as few as two and preferably no more than ten, and in different sizes. However, according to a preferred embodiment the arms 32 have a width of between 0.125" and 0.1875", and preferably about 0.15"; and a length of between about 0.5" and about 1", and preferably about 0.85". The central region 30 is between about 0.2" and about 0.4" in diameter, as determined according to the type of seed being restricted. In this regard, the central region 30 does not have to be circular. As used herein in connection with the size ranges of the cutout, "about" is intended to refer to the stated value plus or minus 0.1".

Figure 2:
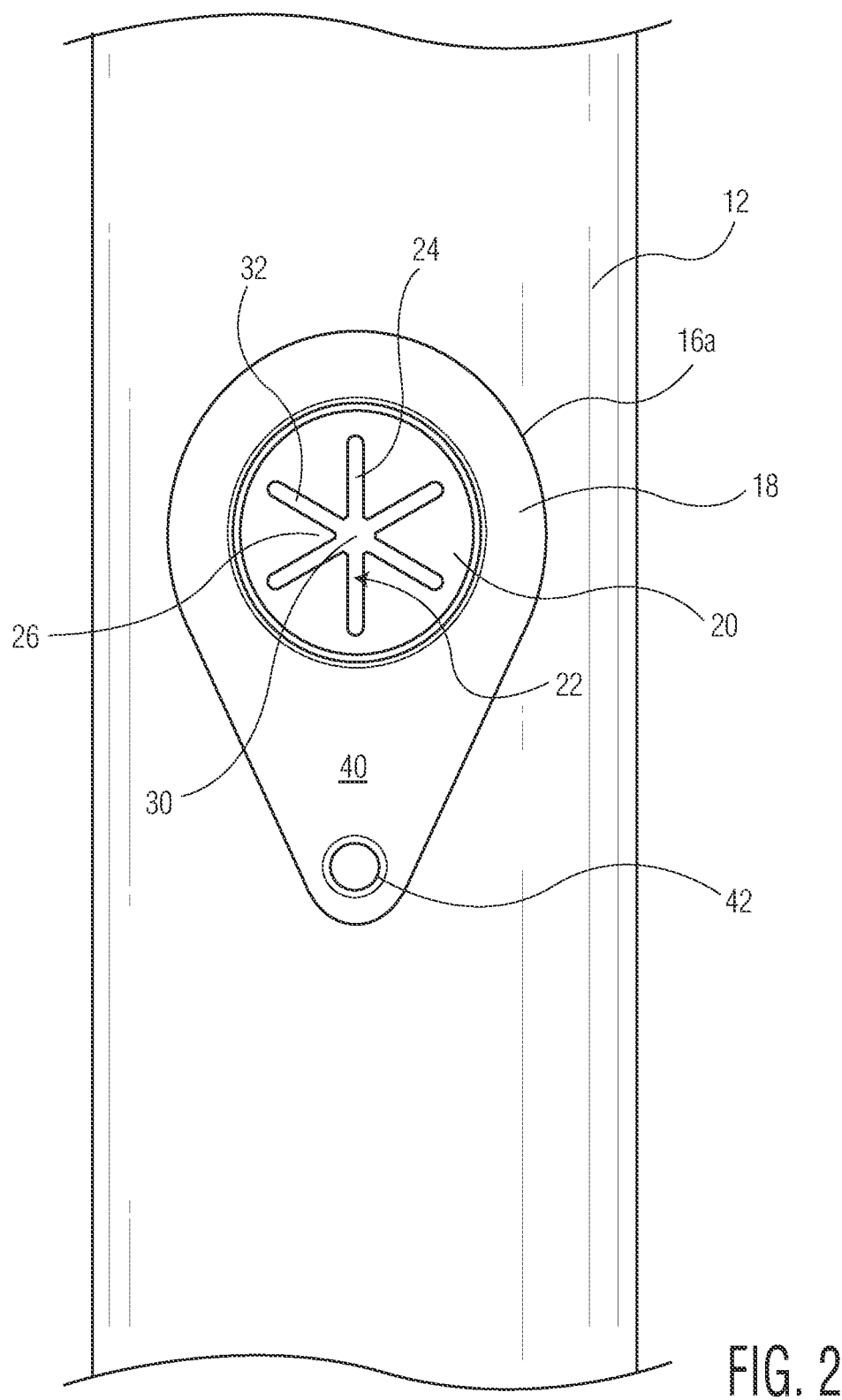
FIG. 2 is a planar view of the upper feed port shown in FIG. 1 without the perch installed.
Figure 3:
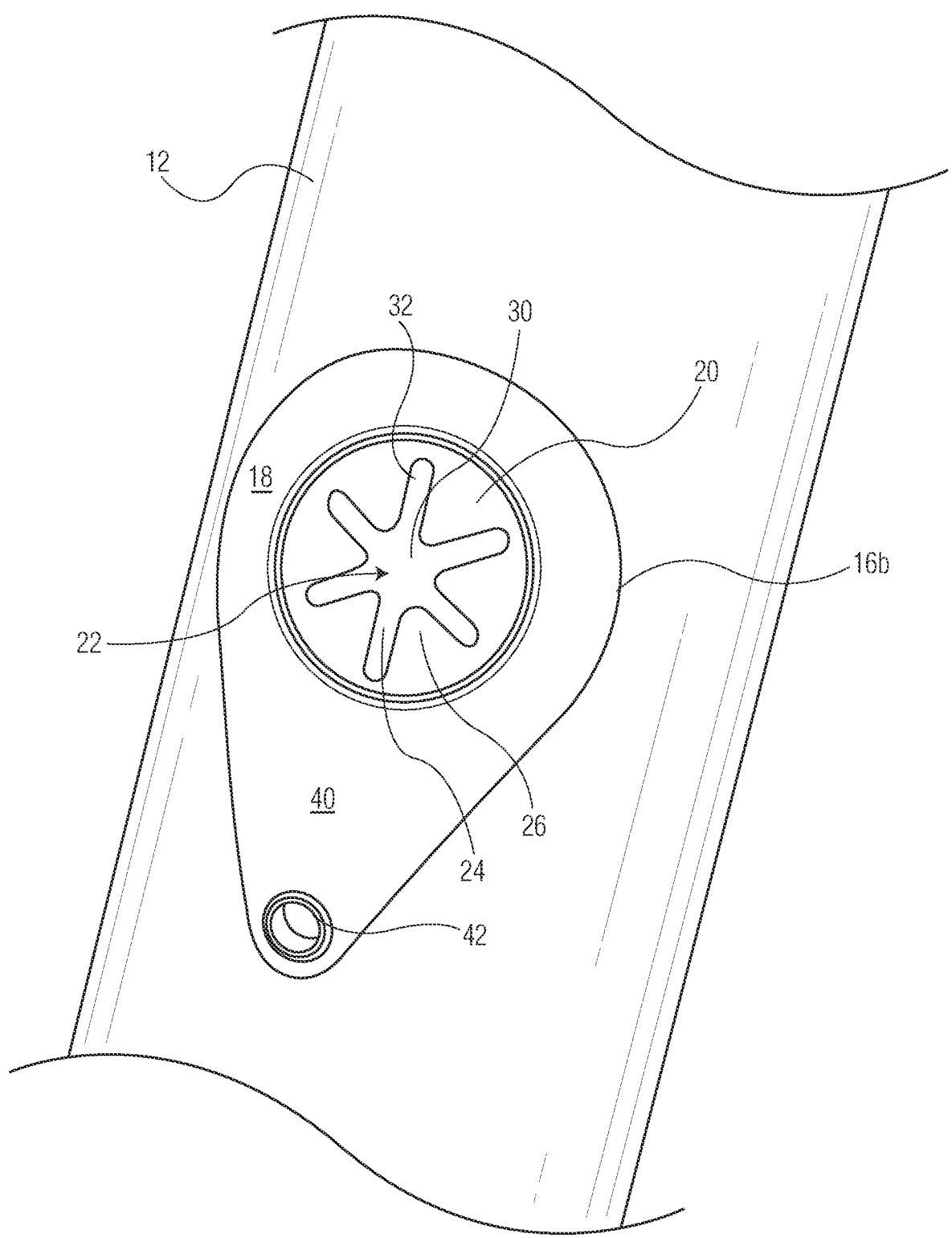
FIG. 3 is a perspective view of the lower feed port shown in FIG. 1 without the perch installed.

A closer view of the upper elastomeric feed port 16a is provided in FIG. 2. Similarly, a closer view of the lower elastomeric feed port 16b is shown in FIG. 3. In each case, a perch mount 40 is formed integrally with the outer ring 18 of the feed port 16, with the perch mount 40 including an opening 42 through which a perch 44 (see FIG. 1) may be inserted and secured to the side of the seed reservoir 12. As shown in FIG. 4, the reservoir 12 has a corresponding perch opening 46 adjacent the seed opening 14 to accommodate such a perch mount.

Figure 5:
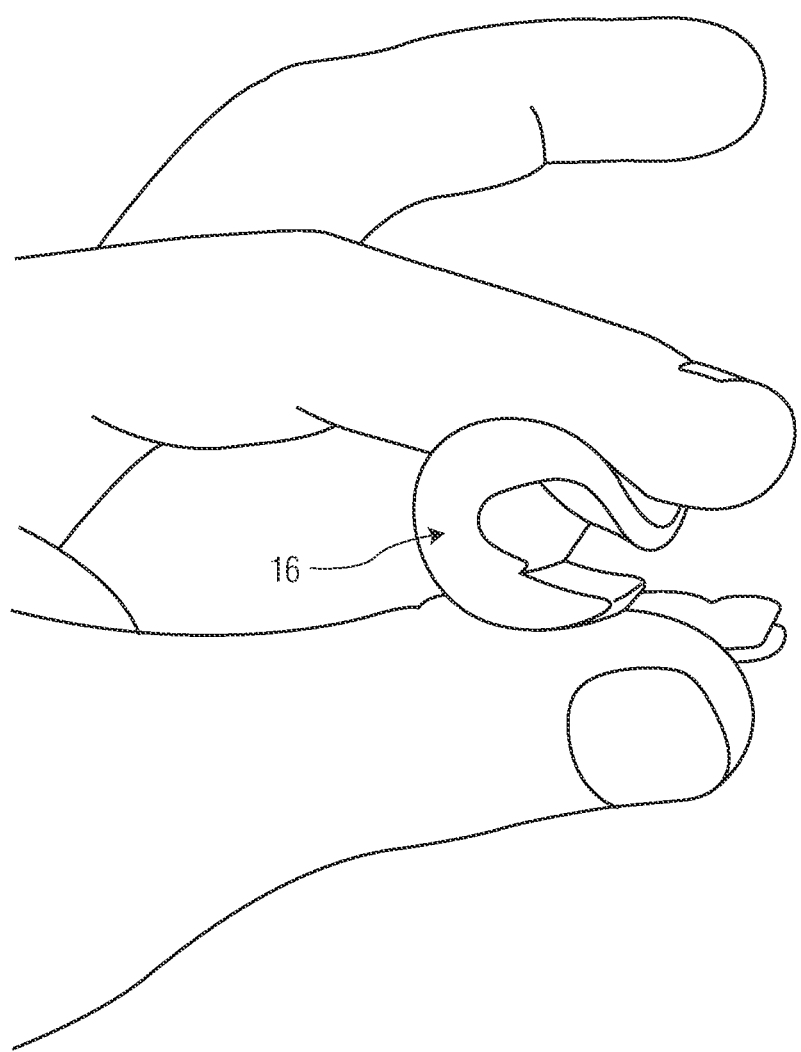
FIG. 5 shows the flexibility of the elastomeric feed port shown in FIG. 4, with the feed port being folded upon itself between a user's thumb and forefinger.

Still referring to FIG. 4, the rear side 48 of the outer ring 18 (see FIGS. 2 and 3) includes an axially-extending flexible flange 50 that is inserted through the seed opening 14 to secure the feed port 16 therein. The flexible flange 50 may include at least one annular groove formed therein (see FIG. 6A, for example) for engaging with walls of the seed opening 14. A flexible annular rim 52 projects rearwardly from the perch opening 42 and is inserted through the perch opening 46 in the reservoir 12 to stabilize the perch mount 40. As shown in FIG. 5, the feed port 16 is flexible and has elastic memory to return to its original shape once mounted to the reservoir 12.

Figure 6A:
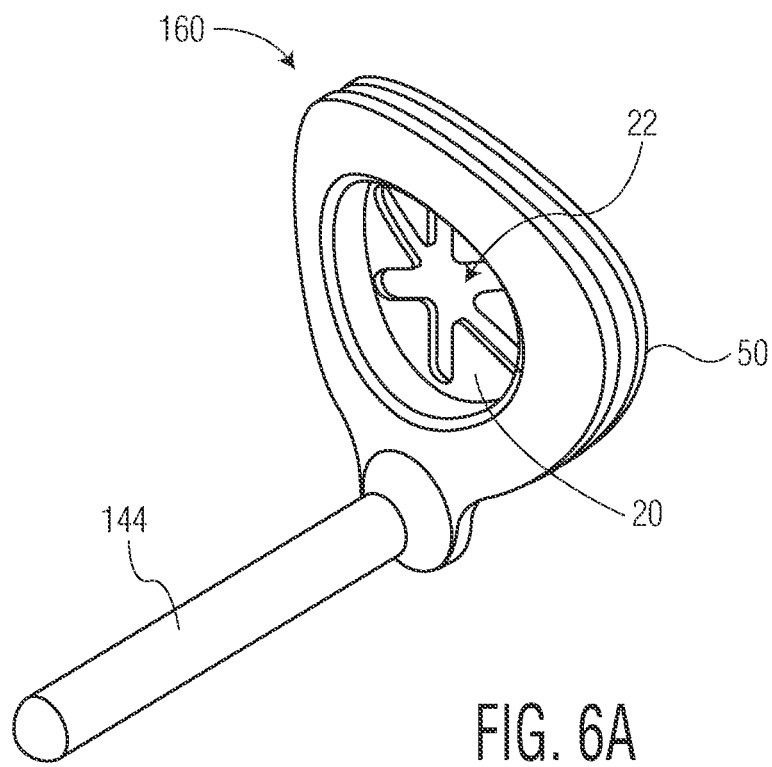
FIGS. 6A and 6B are two isolated perspective views of an elastomeric feed port with an integrated perch in accordance with a second embodiment of the present disclosure.
Figure 6B:
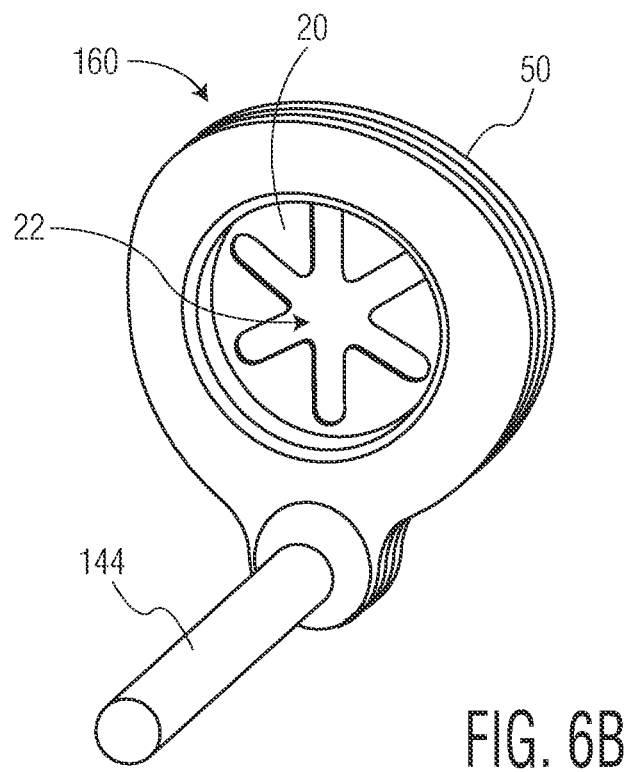

In accordance with the present disclosure, a second embodiment of an elastomeric feed port generally designated by reference numeral 160 is shown in FIGS. 6A and 6B. The elastomeric feed port 160 includes a perch 144 that is formed integrally with the feed port and thus is also elastomeric. The flange 50, the seed control membrane 20 and the cutout 22 are like that of the first embodiment. The rearwardly projecting rim 52 shown in FIG. 4, however, is not necessary with the integral perch 144 of FIGS. 6A and 6B.

Figure 7:
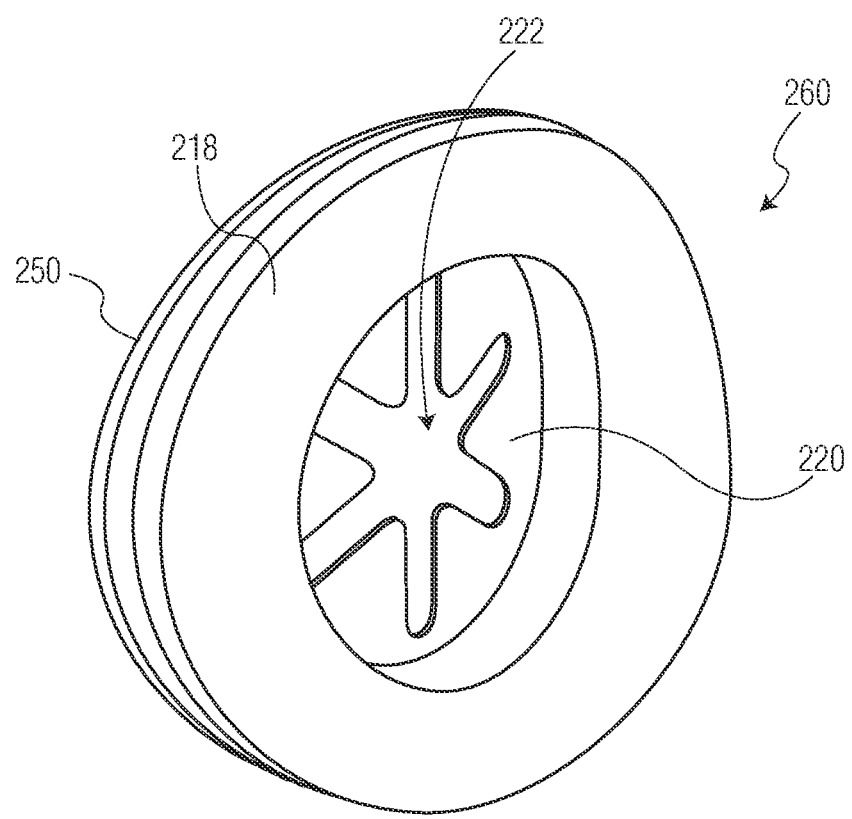
FIG. 7 is an isolated perspective view of a non-perch style elastomeric feed port in accordance with a third embodiment of the present disclosure.

A third embodiment of an elastomeric feed port 260 in accordance with the present disclosure is shown in FIG. 7. The feed port 260 is like that of the first embodiment, having a generally circular elastomeric outer ring 218, a flexible flange 250, and an elastomeric seed control membrane 220 with a cutout 222, but does not include a perch mount.

Figure 8:
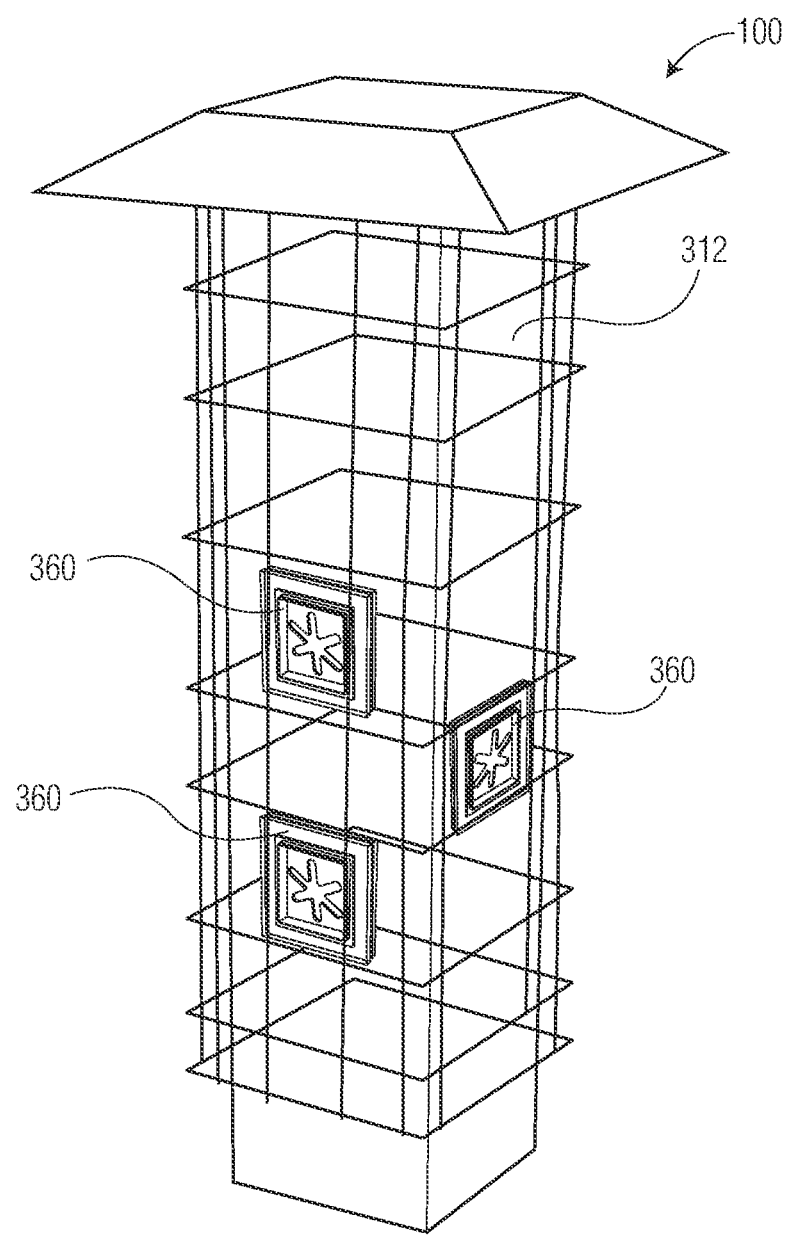
FIG. 8 is a perspective view of a bird feeder having a seed reservoir with a plurality of non-perch style elastomeric feed ports in accordance with a fourth embodiment of the present disclosure.
Figure 9:
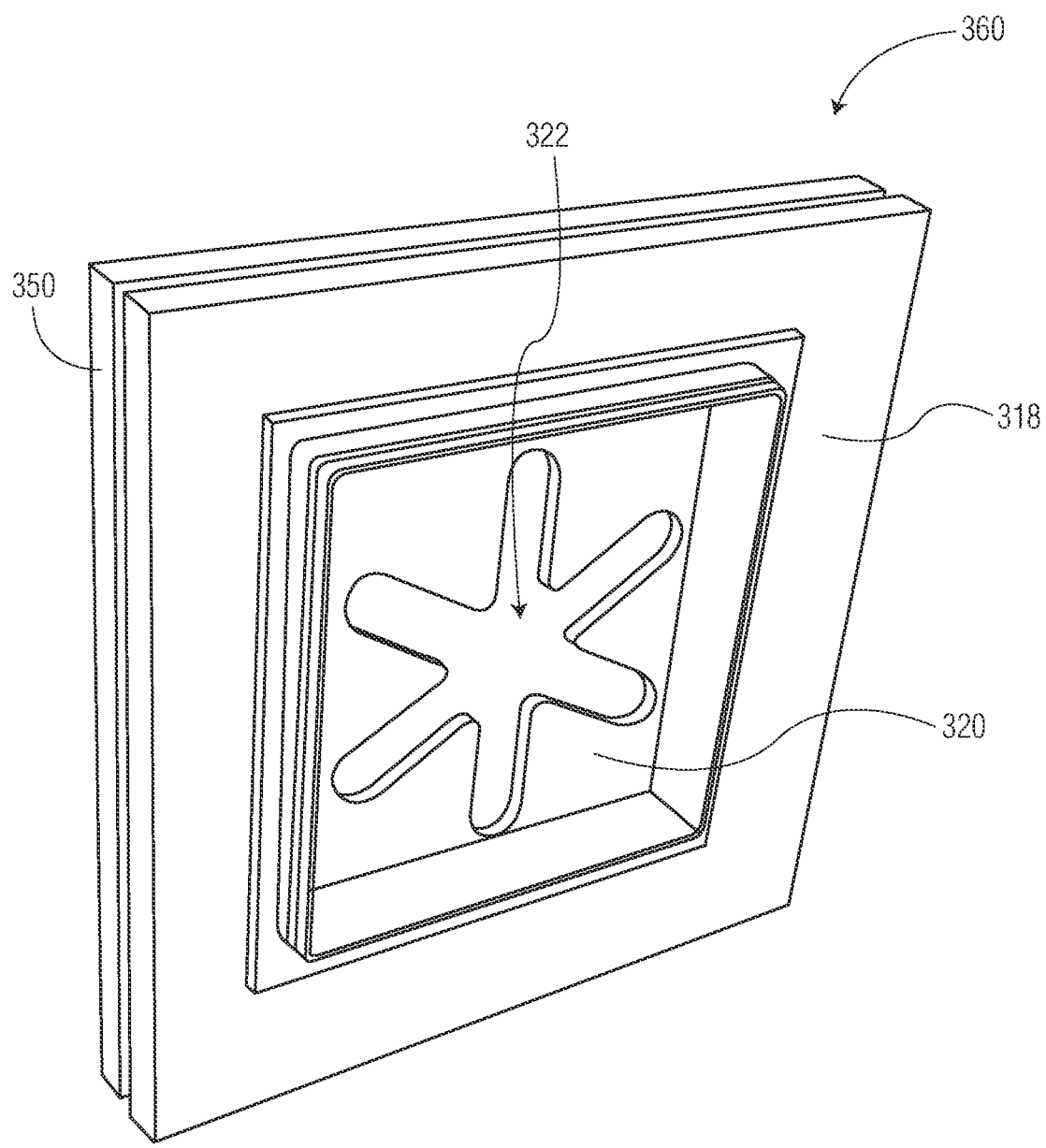
FIG. 9 is an isolated perspective view of the one of the non-perch style elastomeric feed ports shown in FIG. 8.

A bird feeder 100 having a plurality of elastomeric feed ports 360 in accordance with a fourth embodiment of the present disclosure is shown in FIG. 8. FIG. 9 is an enlarged view of the feed port 360. The feed port 360 includes an elastomeric outer ring 318 that surrounds an elastomeric seed control membrane 320 having a cutout 322 as in the third embodiment but, rather than being round, the outer ring 318 and membrane 320 are generally square. The feed port 360 also includes a flexible flange 350 that is inserted through one of the seed openings in the feeder reservoir 312 (see FIG. 8) to secure the feed port 360 therein.

Figure 10:
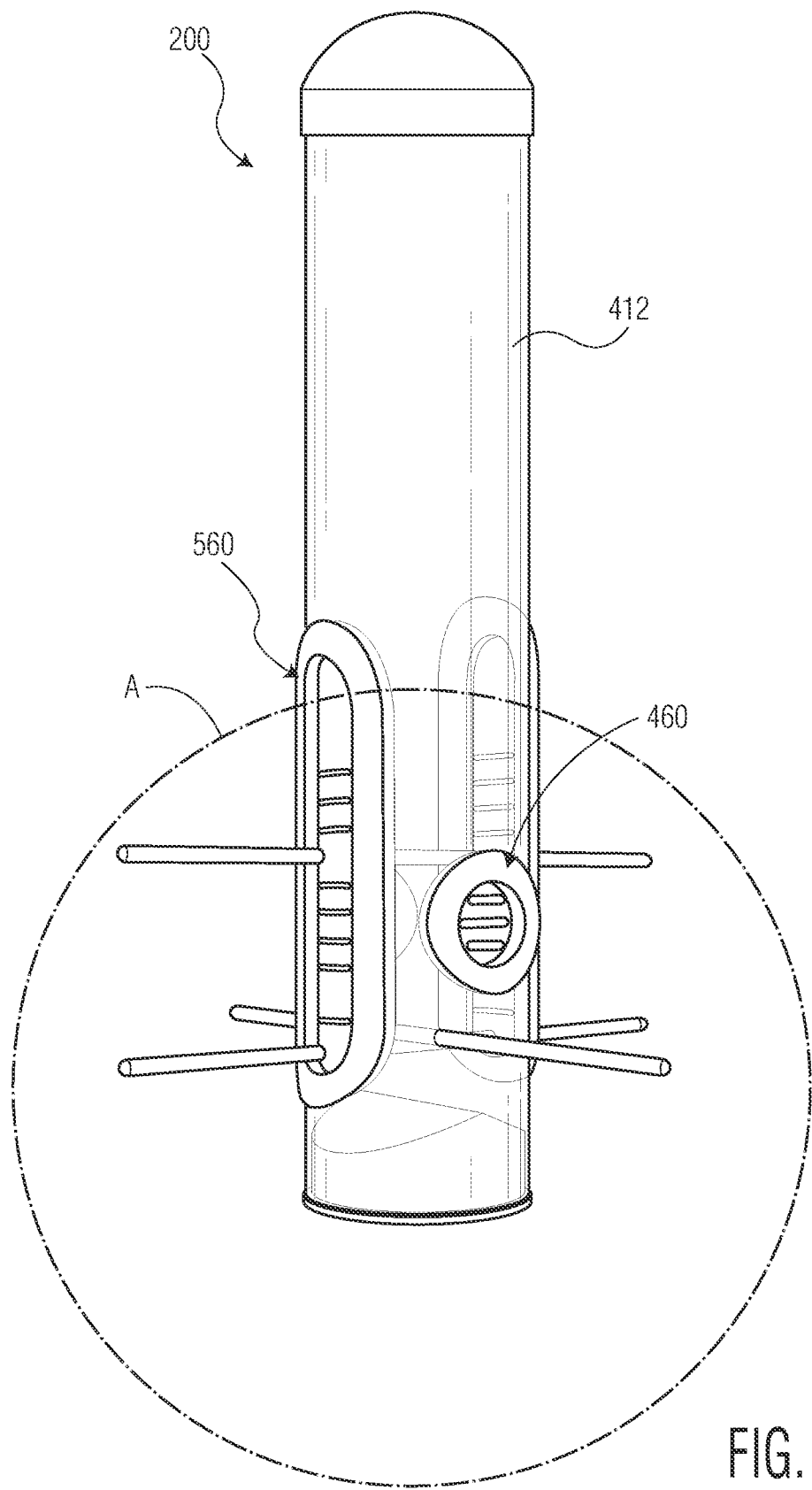
FIG. 10 is a perspective view of a bird feeder having a seed reservoir with two different styles of elastomeric feed ports in accordance with fifth and sixth embodiments of the present disclosure.
Figure 10A:
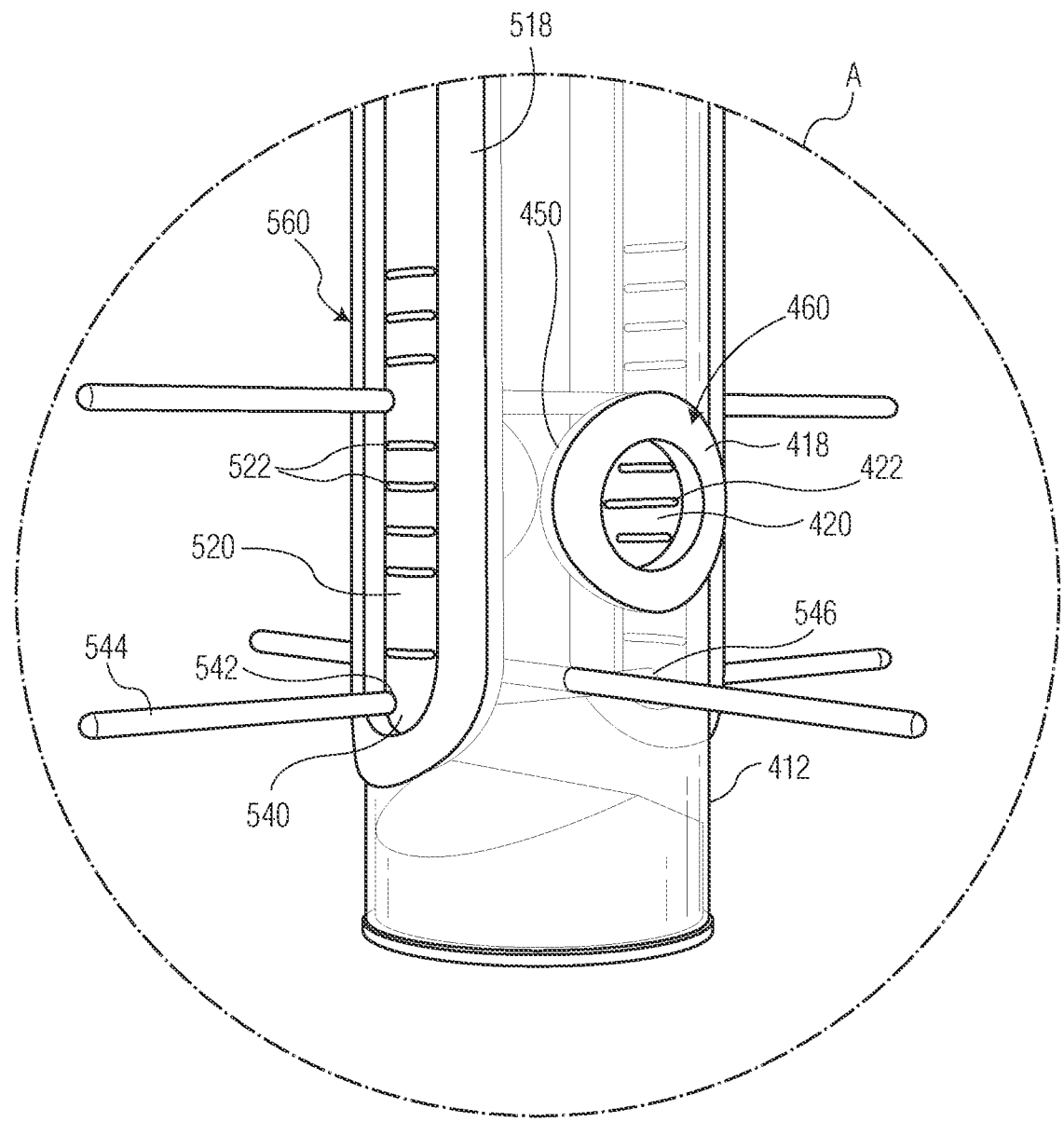
FIG. 10A is an enlarged view of detail A of FIG. 10.

A bird feeder 200 having two types of elastomeric feed ports generally designated by reference numerals 460 and 560 in accordance with fifth and sixth embodiments of the present disclosure, respectively, is shown in FIG. 10. FIG. 10A is an enlarged view of detail A of FIG. 10.

According to the fifth embodiment, the feed port 460 is analogous to the feed port 160 of the third embodiment, having a circular elastomeric outer ring 418 surrounding an elastomeric seed control membrane 420, and with a flexible flange 450 on a rear side thereof to the secure the feed port 460 to the feeder reservoir 412. However, the cutout 422 is embodied as a plurality of elongated slits that are preferably generally parallel with one another. The slits are about 0.06" in opening height to be suitable for dispensing thistle seed. The number and length of the slits may vary but it is preferred that the slits are generally between about 0.5" and about 0.75" in length and number at least two having a spacing from one another of about 0.25".

In addition, while the slits as shown are horizontally oriented, alternatively the slits may be vertically oriented or angled or may have another pattern. The slits may also be grouped in at least one of a group of horizontally aligned slits, a group of vertically aligned slits and a group of angularly aligned slits, with each group being part of a separate feed port such that a single feeder may have a plurality of ports, each having a different or the same slit orientation. In the embodiment shown in which the feed port is generally circular, the different orientations may be achieved by rotating the feed port within the opening in the reservoir side wall. As used in connection with the slits, "generally parallel" means having a relationship that the ordinary person would recognize as being parallel in nature even if not parallel with mathematical precision.

According to the sixth embodiment, a feed port 560 includes an elongated elastomeric outer ring 518 having a longitudinal axis that runs substantially parallel with the longitudinal axis of the feeder reservoir 412 as shown in FIG. 10. An elastomeric seed control membrane 520 is provided with a plurality of cutouts 522 formed as linear slits that extend transverse to the longitudinal axis. The slits may be oriented horizontally (as shown) or may be angled while still having a generally parallel relationship with one another.

The feed port 560 also includes one or more perch mounts 540 formed integrally therewith. Each perch mount 540 includes an opening 542 through which a perch 544 is inserted and secured to the side of the feeder reservoir 412. As best seen in FIG. 10A, the reservoir 412 has a corresponding perch opening 546 to accommodate the perch 544. By having a large number of slits, i.e., on the order of at least 6 to about 15, feeding from the feeder 200 is made easy for birds of a variety of heights as they alight on the perches 544.

Figure 11:
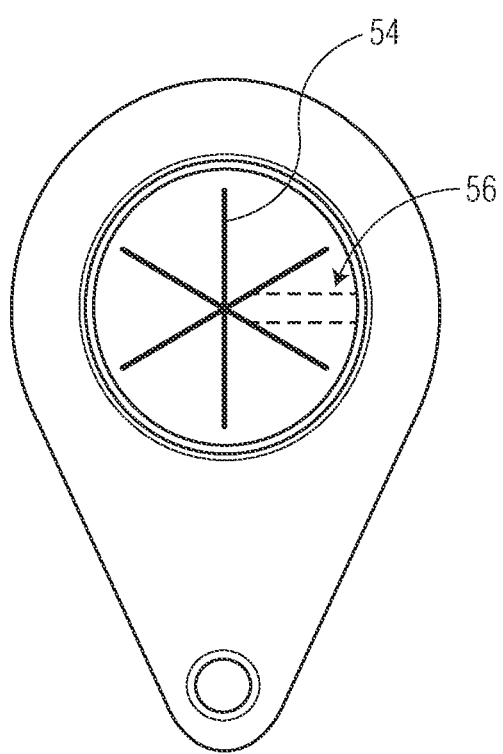
FIG. 11 is a planar view of a feed port in accordance with a seventh embodiment of the present disclosure.

Referring generally to FIG. 11, a feed port according to a seventh embodiment of the present disclosure may include a pattern of slits or cuts 54 formed through a control membrane thereof, as distinct from the openings or cutouts described in accordance with other embodiments herein. In this way, edges of adjacent fingers or flaps defined by these cuts may remain substantially in contact with one another in a resting or unbiased state of the feed port, creating a closed or generally closed membrane covering the seed opening. Openings through the membrane may be created or realized only as, for example, a bird inserts its beak into the membrane, deforming the flaps. In other embodiments, a feed port may include the same slits or cuts 54, as well as at least a central opening or cutout (e.g., central region 30 as shown in FIG. 1). Still referring to FIG. 11, a feed port according to any of the embodiments of the present disclosure may include one or more reinforcing ribs, such as reinforcing rib 56, integrally molded to run along a center line of one or more of the triangular flaps to ensure that the flaps, while being displaceable, also retain sufficient elasticity to return to a seed blocking configuration when birds are not feeding.

In each of the foregoing embodiments, the elastomeric feed port is preferably made of a thermoplastic elastomer (TPE) having a medium durometer, such as TPE 49 Shore A. The feed ports may alternatively be made of silicone or any other elastomeric material. With a feed port made of TPE 49 Shore A, the elastomeric seed control membrane is preferably about 0.08" thick. This thickness may be uniform across the seed control membrane, or the edges of the cutout may be made thinner to facilitate displacement by a feeding bird.

The present disclosure is also directed to a feed port having an elastomeric seed control membrane constructed as described above to block seed spillage that can be fitted within seed openings of various bird feeder reservoirs. The elastomeric seed control membrane has a cutout with the edges thereof being temporarily deformable by a feeding bird to allow access to seed in the bird feeder while being elastic to return to a seed blocking configuration when birds are not feeding. However, the outer ring used with the elastomeric seed control membrane may be made of a hard plastic material like that of the feed port 17 shown in FIG. 1, with the elastomeric seed control membrane being secured within the port 17 using an inner flange like flanges 50, 250, 350, or other securing element(s).

While disclosed herein as a grommet-style feed port, the elastomeric seed control membrane described herein can be incorporated within bird feeder ports having other reservoir mounting configurations. The present disclosure is thus intended to include any bird feeder port having an apertured elastomeric screening membrane that controls an outflow of seed as might occur due to physical displacement of the feeder while the edges of the screening membrane aperture can be temporarily deformed by a bird to enable the bird to access seed in the feeder seed reservoir through the aperture.

The foregoing descriptions and drawings should be considered as illustrative only of the principles of the disclosure. The embodiments may be configured in a variety of shapes and sizes and is not limited by the dimensions of the preferred embodiment. Numerous applications of the present disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

What is claimed is:

1. A bird feeder comprising:
a seed reservoir having at least one seed opening defining a seed access area and at least one first perch opening; and
a feed port fitted over the at least one seed opening, the feed port including:
an elastomeric seed control membrane at least partially covering the seed access area for preventing seed from spilling out of the reservoir and an outer ring surrounding the seed control membrane, the seed control membrane oriented generally parallel to an exterior surface of the seed reservoir defining the at least one seed opening, the membrane including at least one cutout and being deformable in at least one area thereof such that seed in the reservoir may be selectively accessed through the membrane; and
at least one second perch opening aligned with the at least one first perch opening.

2. The bird feeder of claim 1, wherein the cutout defines an aperture in the membrane, the cutout shaped to define flexible flaps adjacent the aperture.

3. The bird feeder of claim 2, wherein the cutout has a central region and a plurality of radially-extending arms defining the flexible flaps, the radially-extending arms forming gaps separating adjacent ones of the flexible flaps from one another.

4. The bird feeder of claim 3, wherein the flaps form generally triangular areas of the membrane defined between pairs of adjacent radially-extending arms.

5. The bird feeder of claim 1, wherein the cutout includes a plurality of generally parallel, linear slits.

6. The bird feeder of claim 1, wherein the feed port comprises an elastic, monolithic body.

7. The bird feeder of claim 1, wherein the feed port includes at least one flexible flange extending in an axial direction of the feed port, the flange engaging with the seed opening for securing the feed port therein.

8. The bird feeder of claim 1, wherein an elongated portion of the outer ring extends in a direction away from a remainder of the feed port and opposes the exterior surface of the seed reservoir, the elongated portion defines at least one of a perch opening or a perch formed integrally with the elongated portion.

9. The bird feeder of claim 8, wherein the seed reservoir has a first perch opening aligned with a second perch opening formed in the elongated portion of the outer ring, the elongated portion of the outer ring defining an annular rim engaging with the first perch opening.

10. The bird feeder of claim 9, further comprising a perch received through the first and second perch openings.

11. The bird feeder of claim 1, wherein feed port includes a first feed port and a second feed port arranged on opposite sides of the seed reservoir, each of the first and second feed ports including a seed control membrane defining a perch opening, the feeder further comprising a shared perch extending through the perch opening of the first feed port, the seed reservoir and the perch opening of the second feed port.

12. The bird feeder of claim 1, wherein the feed port defines an annular rim extending into the first perch opening of the seed reservoir.

13. A feed port for a bird feeder comprising:
an elastomeric seed control membrane for blocking seed spillage in a seed blocking configuration, the elastomeric seed control membrane having a cutout with edges that are temporarily deformable from the seed blocking configuration to provide selective access to seed in the bird feeder while being elastically returnable to the seed blocking configuration, the cutout including a plurality of generally parallel, linear slits; and a perch opening formed through the seed control membrane.

14. The feed port of claim 13, further comprising an elongated outer ring surrounding the elastomeric seed control membrane, the outer ring having a longitudinal axis generally parallel with a longitudinal axis of an associated bird feeder reservoir, the plurality of generally parallel, linear slits being transverse to the longitudinal axis.

15. The feed port of claim 13, wherein the slits are grouped in at least one of a group of horizontally aligned slits, a group of vertically aligned slits and a group of angularly aligned slits.

16. A feed port for a bird feeder comprising:
an elastomeric seed control membrane for blocking seed spillage in a seed blocking configuration, the elastomeric seed control membrane having a cutout with edges that are temporarily deformable from the seed blocking configuration to provide selective access to seed in the bird feeder while being elastically returnable to the seed blocking configuration, the cutout including an aperture in the membrane having an open central region and a plurality of arms defining flexible flaps, the arms forming gaps separating adjacent ones of the flexible flaps from one another in an undeformed state of the seed control membrane; and
an outer ring surrounding the elastomeric seed control membrane; and
a perch opening or a perch formed integrally with the outer ring and positioned below the seed control membrane.

17. The feed port of claim 16, wherein the elastic seed control membrane is recessed with respect to an exterior facing surface of the outer ring.

18. The feed port of claim 16, wherein the outer ring defines a perch opening formed therethrough.

19. The feed port of claim 18, wherein the outer ring defines a protruding annular rim coaxially aligned with the perch opening.

20. The feed port of claim 16, wherein the perch opening or the perch is formed integrally into or on an elongated portion of the outer ring extending in a direction away from a remainder of the feed port.

21. The feed port of claim 16, wherein the outer ring defines a perch extending from the feed port in a direction parallel to a central axis of the open central region of the aperture.

22. A bird feeder comprising:
a seed reservoir having at least one seed opening defining a seed access area; and
a feed port fitted over the at least one seed opening, the feed port including:
an elastomeric seed control membrane at least partially covering the seed access area for preventing seed from spilling out of the reservoir and an outer ring surrounding the seed control membrane, the seed control membrane oriented generally parallel to an exterior surface of the seed reservoir defining the at least one seed opening, the membrane including at least one cutout and being deformable in at least one area thereof such that seed in the reservoir may be selectively accessed through the membrane; and
at least one flexible flange extending in an axial direction of the feed port, the flange engaging with the seed opening for securing the feed port therein.

23. A bird feeder comprising:
a seed reservoir having at least one seed opening defining a seed access area; and
a feed port fitted over the at least one seed opening, the feed port including an elastomeric seed control membrane at least partially covering the seed access area for preventing seed from spilling out of the reservoir and an outer ring surrounding the seed control membrane, the seed control membrane oriented generally parallel to an exterior surface of the seed reservoir defining the at least one seed opening, the membrane including at least one cutout and being deformable in at least one area thereof such that seed in the reservoir may be selectively accessed through the membrane, an elongated portion of the outer ring extends in a direction away from a remainder of the feed port and opposes the exterior surface of the seed reservoir, the elongated portion defines at least one of a perch opening or a perch formed integrally with the elongated portion.

24. A bird feeder comprising:
a seed reservoir having a first seed opening and a second seed opening and defining a seed access area;
a first feed port fitted over the first seed opening and a second feed port fitted over the second seed opening, each of the first and second the feed ports including an elastomeric seed control membrane at least partially covering the seed access area for preventing seed from spilling out of the reservoir and an outer ring surrounding the seed control membrane, the seed control membrane oriented generally parallel to an exterior surface of the seed reservoir defining the at least one seed opening, the membrane including a perch opening and at least one cutout, the membrane being deformable in at least one area thereof such that seed in the reservoir may be selectively accessed through the membrane, the first feed port and the second feed port arranged on opposite sides of the seed reservoir; and
a shared perch extending through the perch opening of the first feed port, the seed reservoir and the perch opening of the second feed port.

* * * * *